(12) United States Patent
Le Coz et al.

(10) Patent No.: US 9,833,759 B2
(45) Date of Patent: Dec. 5, 2017

(54) FLUID DISTRIBUTION DEVICE

(71) Applicant: AXENS, Rueil, Malmaison (FR)

(72) Inventors: Jean Francois Le Coz, Saint Germain en Laye (FR); Daniel Ferre, Saint Cyr sur Rhone (FR); Cyril Collado, Lyons (FR)

(73) Assignee: AXENS, Rueil, Malmaison (FR)

( * ) Notice: Subject to any disclaimer, the term of this patent is extended or adjusted under 35 U.S.C. 154(b) by 698 days.

(21) Appl. No.: 14/300,557

(22) Filed: Jun. 10, 2014

(65) Prior Publication Data

US 2014/0360919 A1 Dec. 11, 2014

(30) Foreign Application Priority Data

Jun. 11, 2013 (FR) ...................................... 13 55365

(51) Int. Cl.
*B01J 8/18* (2006.01)
*B01J 8/02* (2006.01)
(Continued)

(52) U.S. Cl.
CPC ............ *B01J 8/1818* (2013.01); *B01D 3/007* (2013.01); *B01J 8/008* (2013.01); *B01J 8/0278* (2013.01); *B01J 8/0492* (2013.01); *B01J 8/18* (2013.01); *B01J 8/1827* (2013.01); *B01J 8/1872* (2013.01); *B01J 8/24* (2013.01); *C10G 11/18* (2013.01);
(Continued)

(58) Field of Classification Search
CPC ........ B01J 8/008; B01J 8/1818; B01J 8/1827; B01J 8/1872; B01J 8/24; B01J 8/0278
See application file for complete search history.

(56) References Cited

U.S. PATENT DOCUMENTS 2,893,713 A * 7/1959 Haltmeier ................ B01D 3/20
261/114.2
4,715,996 A * 12/1987 Lambousy .......... B01F 3/04113
261/114.2
(Continued)

FOREIGN PATENT DOCUMENTS

| FR | 1534025 A | 7/1968 |
| FR | 2982172 A1 | 5/2013 |
| GB | 447800 A | 5/1936 |

OTHER PUBLICATIONS

Search Report dated Feb. 11, 2014 issued in corresponding FR 1355365 application (pp. 1-2).

*Primary Examiner* — Renee Robinson
(74) *Attorney, Agent, or Firm* — Millen White Zelano and Branigan, PC; Csaba Henter; John Sopp

(57) ABSTRACT

The invention concerns a fluid distribution device (1) comprising:
at least one inlet tube (2) comprising openings (7) and having a first and a second end (3, 4);
a cap (5) comprising a principal body (6) with a lenticular shape and with a circular section elongated by a skirt (8) extending in the direction of the second end (4) towards the first end (3) of the inlet tube (2), said cap (5) having an outer surface and an inner surface, the cap being integral with the second end (4) of the tube via the inner surface and the principal body (6) being provided with a plurality of holes (10);
and in which the cap (5) comprises at least one deflection means (14) disposed on its outer surface and configured to direct or maintain the gas towards or at the periphery of said cap (5).

20 Claims, 4 Drawing Sheets

(51) Int. Cl.

| | | |
|---|---|---|
| *B01J 8/24* | (2006.01) | |
| *C10G 11/18* | (2006.01) | |
| *C10G 47/30* | (2006.01) | |
| *C10G 49/16* | (2006.01) | |
| *B01J 8/00* | (2006.01) | |
| *B01J 8/04* | (2006.01) | |
| *B01D 3/00* | (2006.01) | |

(52) U.S. Cl.
CPC .............. *C10G 47/30* (2013.01); *C10G 49/16* (2013.01); *B01J 2208/0092* (2013.01); *B01J 2208/00929* (2013.01); *B01J 2208/00938* (2013.01); *Y10T 137/85938* (2015.04)

(56) References Cited

U.S. PATENT DOCUMENTS

| | | | | |
|---|---|---|---|---|
| 4,874,583 | A * | 10/1989 | Colvert | B01J 8/228 137/533.11 |
| 5,100,629 | A * | 3/1992 | Tampa | B01J 8/085 261/114.2 |
| 6,098,965 | A * | 8/2000 | Jacobs | B01D 3/20 261/114.2 |
| 7,044,159 | B2 * | 5/2006 | Jacobs | B01D 3/205 137/561 A |
| 2005/0011972 | A1 * | 1/2005 | Barthod | B01J 8/0278 239/499 |

\* cited by examiner

FLUID DISTRIBUTION DEVICE

The invention relates to a device for distributing a monophasic or diphasic fluid in a monophasic or polyphasic ambient medium with a bulk density which is higher than that of the fluid to be distributed.

In particular, the device of the invention is of application in reactors encountered in refining or petrochemicals units, or units for the treatment of feeds obtained from the treatment of biomass.

In particular, the device of the invention can be used to improve the distribution of a gas or a gas mixture in a liquid medium or a medium comprising a fluidized solid. As an example, it is particularly suitable for use in the following equipment:
- reactors for FCC (Fluidized Catalytic Cracking) processes;
- reactors for the regeneration of catalysts, for example for catalytic cracking catalysts;
- reactors comprising a fluidized bed of catalysts;
- hydrotreatment or hydrocracking reactors operating in upflow mode with an inlet for a diphasic gas/liquid or gas/solid stream in the bottom of the vessel;
- slurry reactors;
- strippers, driers, aerators or humidifiers.

PRIOR ART

Gas distribution devices are generally used when a gas or a gas mixture has to be distributed in a homogeneous manner in order to ensure dissolution and uniform mixing between the gas and another phase which is either liquid or solid.

Such devices are, for example, employed in a vessel of a reactor in order to carry out reactions necessitating homogeneous distribution between the gas and a liquid or between a gas and a fluidized solid. As an example, hydrotreatment reactions can be cited, which use a gas which is hydrogen and a liquid which is a hydrocarbon cut in the presence of a catalyst. In order to obtain excellent catalytic performances and high conversions, the hydrogen has to be distributed in a homogeneous manner in the liquid hydrocarbon phase before contact of the diphasic $H_2$/hydrocarbon mixture with the catalytic bed.

These devices may also be installed in reactors for the regeneration or activation of catalysts employing a gas. Examples which may be cited are processes for regeneration by oxychlorination, or processes for activation by sulphurization and/or reduction of catalysts.

Finally, gas distributors may be employed to inject a "fluidization" gas into a catalytic bed in order to maintain the grains of catalysts in a fluidized state.

The document U.S. Pat. No. 5,571,482 discloses an apparatus for controlling the temperature of a catalyst during regeneration thereof (catalyst cooler). That apparatus is used with a two-stage catalyst regeneration system and in the context of a fluidized bed catalytic cracking process (FCC). In that document, a "mushroom" type distributor is used to distribute the catalyst and the fluidization gas in the dense phase of the fluidized bed of the regenerator.

Referring to FIG. 1, the "mushroom" type distributor of the prior art comprises:
- a hollow gas inlet tube with a first and a second end, the tube being provided with openings to allow a portion of the gas which is supplied via the tube to pass through;
- a cap with a lenticular shape, a circular section and having a convex outer surface and a concave inner surface, the cap being integral with the second end of said tube via the inner concave surface. The cap is also provided with through holes that can allow the gas to pass and also comprises, at its free end, a circular skirt extending towards the first end of the hollow tube. The internal volume is defined as being the volume delimited by the cap and acting as a reservoir for gas to be distributed through the through holes.

In operation, the gas which escapes through the openings of the inlet tube accumulates below it up to a certain height near the lower edge. Thus, a pressure difference is established between the upper face and the lower face of the cap and which is equal to the height of the gas pocket ($H_{gas}$) multiplied by the density difference between the gas and the ambient medium ($rho_{ambient}$-$rho_{gas}$) and by the gravity constant (g):

$$dP = H_{gas} * (rho_{ambient} - rho_{gas}) * g$$

This pressure difference contributes to distributing the gas accumulated under the cap and over its entire projected area by means of the calibrated through holes the number and spacing of which are calculated so that the total conveying surface of the holes is not sufficient to allow all of the gas entering the vessel to pass through.

Thus, a portion of the gas which is injected and which escapes from the tube spills over the lower edge of the skirt of the cap to ensure the constant presence of the pocket of gas below the cap and the continuity of the operation of the distributor.

Although it is functionally viable, this gas distribution device can be improved upon. In fact, it has been shown that the gas spilling out below the lower edge (at the skirt) of the distributor does not detach itself rapidly from this edge but, in contrast, remains near the upper surface of the cap and continues to move along it very far from the edge so as to create a centripetal movement which is exerted on the gas. As a consequence, the gas has a tendency to become concentrated towards the central axis of the device from where it is detached and, by a chimney effect, forms a single jet at the centre of the vessel. Furthermore, part of the fraction of gas passing through the holes of the cap is then grabbed by this gas plume coming from the lower edge so that it is also entrained towards the central axis of the distributor, thereby creating a non-uniformity in the distribution of gas above the cap.

One aim of the invention is to improve the operation of the fluid distributor described above, and in particular to propose a "mushroom" type distributor which produces a uniform distribution of fluid leaving said distributor while reducing the phenomenon of the formation of a central plume of fluid leaving the distributor.

SUMMARY OF THE INVENTION

Thus, the present invention concerns a fluid distribution device comprising:
- at least one means for channelling a fluid, comprising openings and having a first and a second end;
- a cap comprising a principal body in the shape of a bell, the principal body having an outer surface and an inner surface and being integral with the second end of the means for channelling fluid via the inner surface, said principal body being elongated by a skirt extending in the direction of the second end towards the first end of the fluid channelling means and being provided with a plurality of holes;

and in which the cap comprises at least one deflection means disposed on its outer surface and configured to direct or maintain the fluid towards or at the periphery of said cap.

The device of the invention is a substantial improvement over the prior art distributor of FIG. 1 because of the addition of a deflection means disposed on the outer surface of the cap. In the context of the invention, the term "deflection means" is intended to designate not only means which can prevent the fluid escaping from the lower edge (or free end) of the skirt from rising along the outer surface of the cap, but also means which are designed to deflect and remove, from the centre of the cap, the fluid escaping from the lower edge (or free end) of the skirt.

This deflection means can thus be used to force the fluid spilling out from the lower edge of the skirt to be detached from the upper surface, and thus can reduce or cancel out the centripetal force which has the effect of creating a central plume of fluid. The uniform distribution of the fluid is thus improved, because the fraction of fluid passing through the holes is no longer subjected to suction towards the central axis of the distributor, but in contrast forms independent globules of fluid (for example bubbles when the fluid is a gas) which are distributed in an ideal manner over the whole of the projected area of the distributor in accordance with the placement of said holes.

Preferably, the deflection means is disposed on the outer surface of the principal body and is integral with said principal body.

Preferably, the fluid channelling means is a tube.

Preferably, the principal body is lenticular in shape with a circular section and is elongated by a cylindrical skirt. Alternatively, the principal body has a tronconical shape elongated by a cylindrical skirt.

The deflection means comprises a deflecting surface and the deflection means form an angle $\alpha$ with the axis of the skirt in the range 0° to 70°.

Advantageously, the deflecting surface is essentially in alignment with said skirt and the angle $\alpha$ is essentially equal to 0°. In this embodiment, the deflection means thus extends in an upwardly and practically vertical direction with respect to the skirt.

In a preferred embodiment, the deflection means forms a continuous circular flange arranged at the periphery of the cap. Preferably, the flange extends in an upwardly and practically vertical direction with respect to the skirt.

Advantageously, the skirt comprises notches located at the free end of said skirt in order to maintain a fluid/ambient medium interface which is stable (to limit fluctuations at the interface) below the cap of the distribution device. Preferably, the notches are triangular or rectangular in shape.

When the skirt of the distribution device comprises notches, the deflection means is disposed at a level located above said notches.

Advantageously, in order to ensure homogeneous distribution of fluid beyond the cap, the through holes formed in the cap are disposed over the principal body in a concentric manner in a regular pattern. Preferably, the through holes have a circular section.

In the context of the invention, the fluid is preferably a gas, a liquid, a gas/liquid mixture or a gas/solid mixture. The device can be used to distribute the fluid in a monophasic or polyphasic ambient medium with a higher bulk density than that of the fluid to be distributed. The ambient medium is, for example, a gas, a liquid, a gas/liquid mixture or a mixture of a gas and a solid fluidized in the gas.

The distributor of the invention is of particular application in the case in which the fluid is a gas which has to be distributed in a homogeneous manner in an ambient medium which may be liquid, or a phase comprising a solid fluidized by a gas.

In particular, the distribution device is applicable for carrying out catalytic reactions requiring good mixing of a gas phase and a liquid phase. Non-limiting examples which can be cited are the hydrotreatment of hydrocarbons in which the gas phase to be distributed primarily comprises hydrogen and the ambient liquid medium is constituted by a mixture of hydrocarbons. The term "hydrotreatment" is intended to designate hydrocracking, hydrodesulphurization, hydrodenitrogenation, selective or complete hydrogenation, or hydrodemetallization of hydrocarbon cuts, for example.

The device of the invention is also applicable to cases of selective hydrogenation of gasolines from steam cracking, from the hydrogenation of aromatic compounds in aliphatic and/or naphthenic cuts and for the hydrogenation of olefins in aromatic cuts. The device of the invention is also of application in other reactions necessitating good mixing of a gas phase and a liquid phase, for example partial or complete oxidation reactions, amination, acetyloxidation, ammoxidation and halogenation, in particular chlorination, reactions.

Finally, the distribution device of the invention is of particular application for the distribution of a gas in a fluidized ambient medium comprising a solid (for example grains of catalyst) in suspension in a gas which may be the same or different from the gas which is distributed by means of the device.

The invention also pertains to a reactor comprising a vessel and a distribution device of the invention. In the context of the present invention, the term "reactor" designates any device comprising a vessel which can receive the distribution device. It may, for example, be a reactor in which a chemical transformation reaction is carried out.

In one embodiment, the reactor of the invention comprises a granular bed which is placed downstream of said distributor. The term "granular bed" means an assembly of solid particles in the shape of grains; these grains may have any shape, but are usually approximately cylindrical or spherical, and have typical dimensions of the order of a few millimeters. These granular solids advantageously have a catalytic activity. Preferably, the mixing and distribution device of the present invention is integrated into a reactor which may contain one or more fixed granular beds in succession and separated one from the other.

Alternatively, the reactor may comprise a fluidized bed of catalysts and in which the distribution device is immersed. This type of reactor is, for example, employed to regenerate catalysts using a regeneration gas; in this case, the noun "regenerator" can be used instead of "reactor".

The invention also pertains to the use of a reactor as defined above in a process for the treatment of a hydrocarbon feed, or in a process for the treatment of catalysts contained in a granular bed, or for the treatment of a catalyst in a fluidized bed. In the context of the present invention, the term "treatment of catalysts" is intended to mean any treatment modifying the chemical composition of the catalyst, such as sulphurization or reduction of catalysts for example.

DETAILED DESCRIPTION OF THE INVENTION

Other characteristics and advantages of the invention will be better understood and become more apparent from the following description, made with reference to the drawings in which.

In general, identical elements are denoted by the same reference numerals in the figures.

Figure 1:
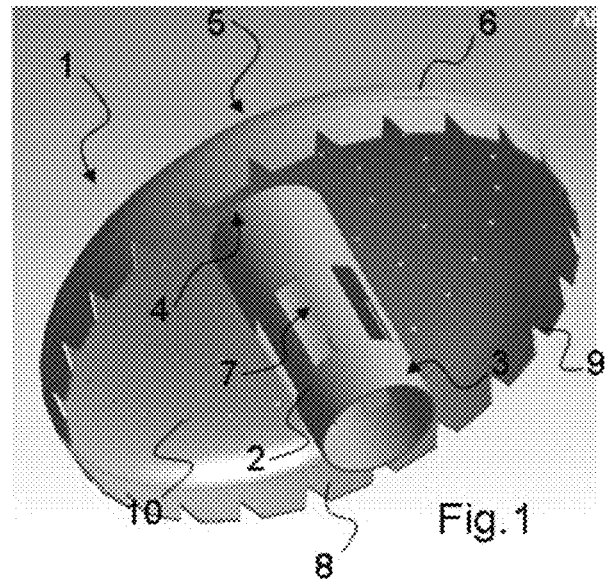
FIG. 1 represents a perspective view of a prior art distribution device.

FIG. 1 shows a distribution device 1 for a fluid, for example a gas or a mixture of gases in accordance with the prior art, of the "mushroom" type produced from metal or metal alloy (carbon steel, low alloy steel, austenitic steel). This device comprises an inlet tube 2 with a first and a second end 3, 4, and a cap which is mounted on the second end 4 of said tube 2, for example by welding, screwing, wedging or clipping.

The cap 5 is formed by a principal body 6 in the form of a bell which is elongated by a skirt 8 extending in the direction of the first end 3 of the inlet tube 2. In the particular embodiment of FIG. 1, the principal body 6 is lenticular in shape with a circular section and is elongated by a cylindrical skirt. In another embodiment, the principal body of the device of the invention may also be tronconical in shape.

The dimensions of the cap 5 are such as to cap a surface area which is greater than that of the section of the inlet tube 2. The diameter of the principal body is also selected as a function of the internal diameter (ID) of the reactor in which the device is placed. Preferably, the ratio between the diameter of the principal body and the internal diameter (ID) of the reactor is in the range 0.1 to 0.8, preferably in the range 0.5 to 0.7. As an example, the diameter of the principal body is in the range 1 to 3 meters.

The cap has a convex outer surface projecting above the cap and in a direction opposite to the inlet tube 2, and a concave inner surface projecting in the direction of the inlet tube 2.

Figure 2:
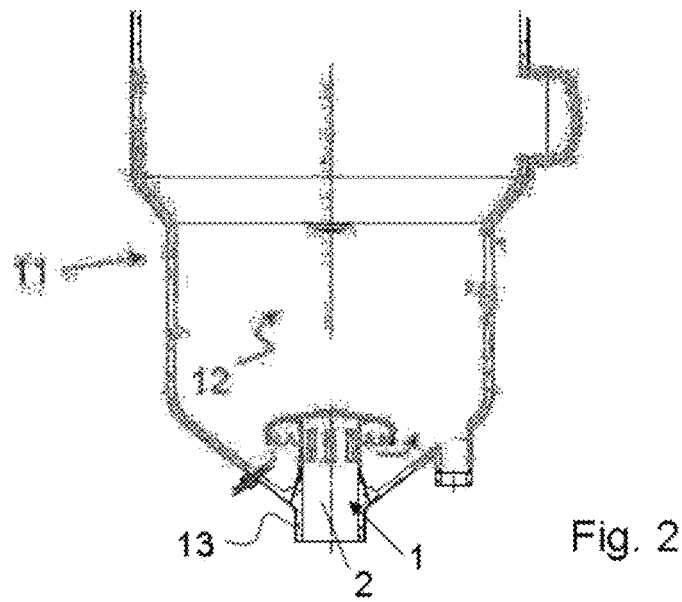
FIG. 2 represents a perspective view of the interior of a vessel which may, for example, be that of a reactor or regenerator equipped with a prior art distribution device.

The inlet tube 2 can supply fluid, for example a gas or a diphasic mixture (gas/liquid) or (gas/solid), to the interior of a vessel in which said device 1 is placed, as can be seen in FIG. 2.

The inlet tube 2 is preferably disposed at the centre of the cap 2, i.e. at the centre of the principal body 6. The tube 2 also comprises openings 7 which may be circular or rectangular in section (as can be seen in FIG. 1) or any other shape which allows fluid to leave the inlet tube 2. The openings 7 are preferably disposed in the upper half of the tube 2.

As can be seen in FIG. 1, the direction of the skirt 8 and that of the inlet tube 2 are substantially parallel to each other. However, in the context of the invention, the two directions may form an angle in the range 0° to 45°.

The skirt 8 also comprises notches or cut-outs 9, for example with a triangular section, which communicate with the free end of the skirt 8.

The principal body 6 is provided with a plurality of through holes or orifices 10, disposed in a concentric manner and preferably with a regular pattern. The orifices 10 are preferably circular in section with a calibrated diameter which is generally in the range 5 to 50 mm, preferably in the range 10 to 20 mm. The density of the holes may be from 20 to 200 per square meter.

The distribution device 1 is used in reactors in which a uniform diffusion of fluid has to be produced in the vessel of said reactor. In particular, this device is capable of carrying out reactions necessitating intimate contact between a gas (or a mixture of gases) and a liquid and/or a solid.

The device of the invention is generally disposed in a reactor in which, for example, catalytic conversion reactions or catalyst transformation reactions are carried out, for example activation by reduction or sulphurization, or a regeneration treatment is carried out, using a gas or a mixture of gases.

As can be seen in FIG. 2, the distribution device 1 is arranged in the lower portion of the vessel 12 of the reactor 11 using a sleeve 13 forming an integral part of the reactor 11 which receives a portion of the inlet tube 2 of the device 1. Thus, the fluid to be distributed is sent to the vessel 12 as an upwardly flowing stream.

The reactor 11 may be of the fluidized bed type comprising a vessel 12 containing a fluidized bed of catalysts, i.e. the grains of catalyst are in suspension in the gas phase contained in the vessel. Such a fluidized bed reactor (or regenerator) is used in particular for the regeneration of catalysts, for example FCC, using a combustion gas. In such an application, the distribution device 1 of the invention which is immersed in an ambient medium essentially constituted by gas and solid in suspension, is supplied with a diphasic mixture comprising a conveying gas and the solid catalyst to be regenerated.

In another application, the vessel 12 is included in a reactor 11 of the fixed catalytic bed reactor type in which a granular bed of catalysts (not shown) supported by a plate is disposed downstream of the distribution device 1. Such an upflow type reactor is used, for example, for the hydrotreatment of hydrocarbon feeds, which requires a good distribution of gas (hydrogen) and liquid (the hydrocarbon feed) upstream of the bed of catalysts. For this application, a diphasic mixture containing the reaction gas as a mixture with the liquid hydrocarbon feed to be treated is sent to the reactor by means of the distribution device 1 in the vessel 12 of the reactor 11.

Referring to FIG. 2, it will be noted that the diameter of the cap 5 is smaller than the internal diameter of the vessel 12, so that a portion of the injected fluid can escape from the openings 7 of the inlet tube 2 and move freely in the vessel 12.

The operation of the distribution device is described below in the case in which the fluid which is distributed is a gas and the ambient medium is a liquid which is denser than the gas.

The gas is sent through the inlet tube 2 and escapes through the openings 7 of the tube so that the gas accumulates below the cap 5 up to a certain height near to the lower edge of the skirt 8. Thus, a pressure difference is established between the upper face and the lower face of the cap which is equal to the height of the gas pocket ($H_{gas}$) multiplied by the difference in density between the gas and the liquid phase ($rho_{ambient} - rho_{gas}$) and by the gravity constant (g):

$$dP = H_{gas} * (rho_{ambient} - rho_{gas}) * g$$

This pressure difference contributes to distributing the fluid to be distributed accumulated under the cap 5, which can then escape over the whole of its projected area by means of calibrated holes 10 the number and spacing of which are calculated so that the total conveying surface of the holes does not allow all of the gas entering the vessel to pass through. Thus, a portion of the gas which is injected escapes from the tube and spills out from the lower edge of the skirt of the cap to guarantee the presence of the pocket of gas under the cap and the continuous operation of the distribution device 1.

In practice, it is ensured that when operated at a slower rate (typically 50% of the normal flow rate), gas still spills out from the lower edge and a gas pocket still forms below the cap.

The pressure drop formula $dP = \frac{1}{2} K \, rho_{gas} (V_{gas})^2$ is used to calculate the flow rate in a hole and thus to determine the total number of holes which are necessary.

Inverting the formula results in the following equation for the number of holes:

$$N_{holes} = \frac{4}{\pi} * \frac{Q_v}{d_{holes}^2} * \sqrt{\frac{rho_{gas} * K}{2 * dP}}$$

where $Q_v$: volume flow rate of gas passing through all of the holes which is itself a fraction of the total gas flow rate;

$d_{holes}$: diameter of holes;

$rho_{gas}$: density of gas;

dP: pressure difference imposed by the gas pocket;

K: pressure drop coefficient, which is generally between 1.5 and 2.7 depending on the geometry of the hole.

Figure 3:
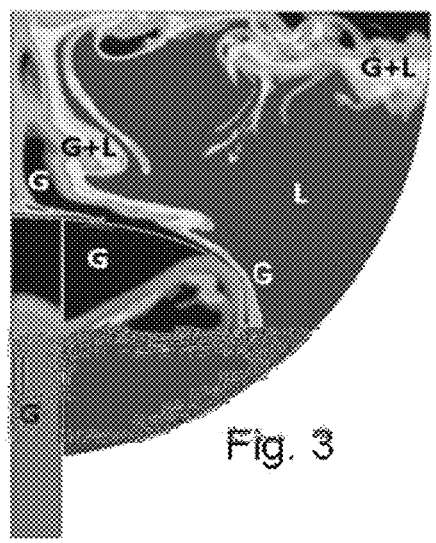
FIG. 3 represents an example of a simulation, using CFD (Computational Fluid Dynamics) computer modelling, of the liquid and gas flows through the prior art distribution device.

FIG. 3 is the result of a simulation using "Fluent" CFD (Computational Fluid Dynamics) type computer modelling software, showing the distribution of the flow of materials at the cap 5 of the distribution device of the prior art. In FIG. 3, the reference numerals "G", "L" and "L+G" indicate that the flow of materials is essentially constituted by gas, liquid or a gas/liquid mixture respectively.

Referring now to FIG. 3, it will be seen that the gas G spilling out below the lower edge (at the skirt 8) of the distributor 1 does not detach itself rapidly from this edge, but in contrast remains close to the upper surface of the cap 5 and continues to follow it a long way from the edge, in a manner such that a centripetal movement is created which is exerted on the gas G. As a consequence, the gas has a tendency to become concentrated towards the central axis of the device where it detaches itself and, by a channelling effect, forms a single jet at the centre of the vessel. Further, the fraction of gas passing through the holes 10 of the cap 5 is partially grabbed by this plume of gas deriving from the lower edge so that it is also entrained towards the central axis of the distributor 1, thereby creating a non-uniform distribution of gas in the liquid above the cap 5 in the direction of the catalytic bed.

In order to limit or eliminate the formation of a plume of fluid flowing along the outer surface of the cap, the Applicant has developed an improved distribution device.

Figure 4:
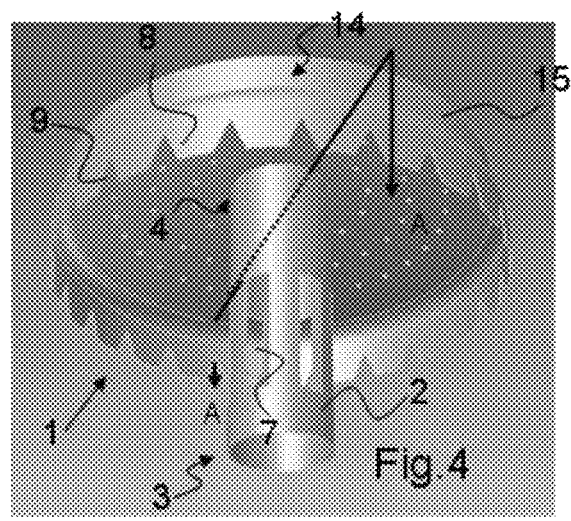
FIG. 4 represents a perspective view of a first embodiment of a distribution device in accordance with the invention.
Figure 5:
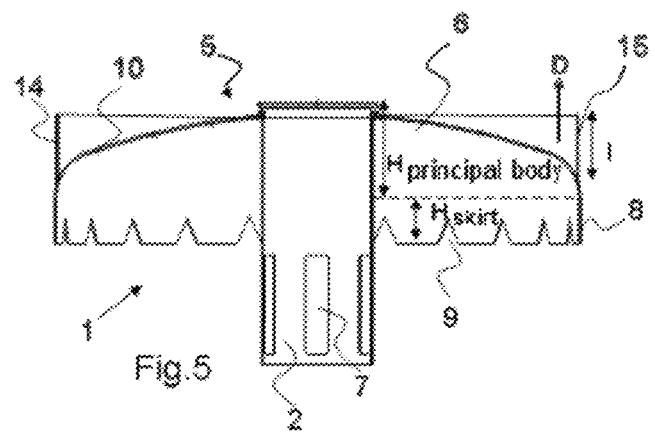
FIG. 5 represents a sectional view of the distribution device of FIG. 4.

FIGS. 4 and 5 are respectively a perspective view and a sectional view along the line AA in FIG. 4 of a first embodiment of a distribution device in accordance with the invention.

The device of the invention essentially differs from the device of FIG. 1 in the presence of a deflection means 14 which is disposed on the outer surface of the cap 5. Thus, the features described with respect to the device of FIG. 1 and its operating principle are applicable to the device of the invention, unless otherwise indicated in the description.

Figure 7:
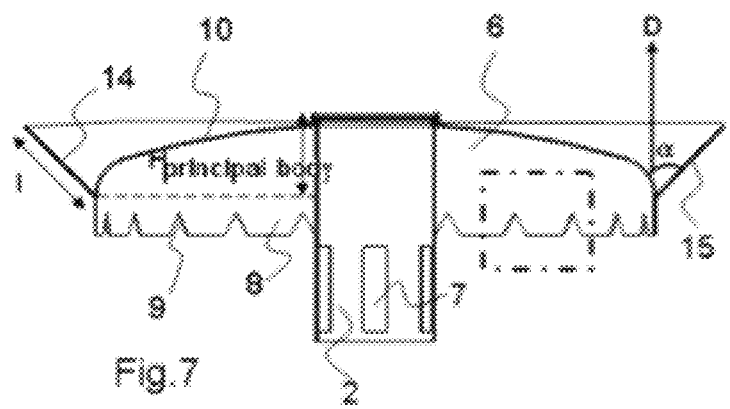
FIG. 7 represents a sectional view of a second embodiment of a distribution device in accordance with the invention.

In the context of the invention, the deflection means 14 is configured to direct the flow of fluid spilling out of the skirt 8 towards the periphery of the cap 5 or to maintain the flow of fluid spilling out of the skirt 8 at the periphery of the cap 5, thereby preventing it from rising along the outer surface. As indicated in FIGS. 4, 5 and 7, the deflection means 14 is preferably disposed on the outer surface of the principal body 6 in an integral manner.

The deflection means generally forms an angle α with the axis D of the skirt 8 which is in the range 0° to 70°.

The deflection means 14 is preferably a continuous flange, extending around the cap 5, which has an essentially planar deflection surface 15.

In the embodiment of FIGS. 4 and 5, the deflection means 14 is a circular flange forming an angle α equal to 0°, such that the deflection surface 15 extends in a direction parallel to the skirt 8 and in a direction opposite to the end of said skirt 8. In a preferred embodiment, the deflection means is a flange disposed in the extension (linear) of the skirt 8 and vertical thereto.

This deflection flange is, for example, welded to the cap 5 of the distribution device.

In a particular embodiment, the upper free edge of the deflection means (or flange) is provided with notches, for example triangular or rectangular in shape, which promote the generation of small bubbles of fluid (for example gas) by a turbulence effect.

Figure 6:
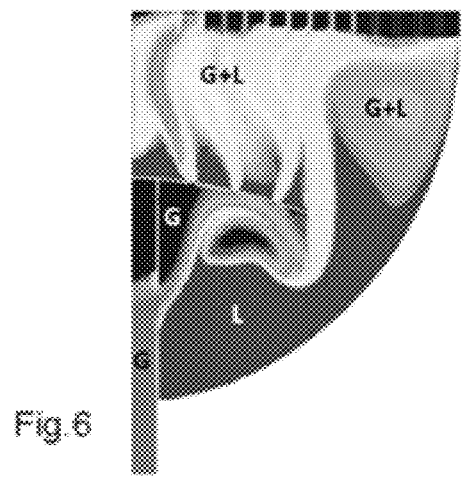
FIG. 6 represents an example of a simulation, using CFD (Computational Fluid Dynamics) computer modelling, of the liquid and gas flows through the distribution device of FIG. 4.

The effect of the presence of the deflection means in the embodiment of FIGS. 4 and 5 on the flows of liquid and gas in a reactor equipped with the distribution device is illustrated in FIG. 6 in which the references "G", "L" and "L+G" indicate that the medium is essentially constituted by gas, liquid or a mixture of gas and liquid respectively.

It will be observed that the device of the invention can be used to maintain the flow of gas spilling out from the skirt 8 at the periphery of the cap, while preventing it from returning to the centre of the cap so as to prevent it from creating a central jet of gas, as with the distributor of the prior art. The presence of a deflection means also ensures homogeneous distribution and homogeneous mixing in the ambient medium (for example a liquid medium or a gas/solid medium) of bubbles of gas escaping from the upper surface of the cap 5 via the orifices 10. In fact, the gas passing through the orifices 10 are not subjected to suction towards the centre of the cap due to the rising gas escaping from the skirt along the surface of the cap, but form independent bubbles distributed in an ideal manner over the whole of the projected area of the distributor.

Another embodiment of the gas distribution device is shown in FIG. 7. The device is similar to the embodiment of FIG. 5 and differs in that the flange 14 forms an angle α of approximately 45° with the axis D of the skirt 8.

In this embodiment, the deflection surface is configured to direct the flow of fluid overflowing from the skirt towards the outside of the periphery of the cap 5 in order to limit or even cancel out the suction phenomenon described above.

With reference to FIGS. 4 and 5, the length 1 of the deflection surface 15 of the deflection means 14 is selected such that 1 is more than 0.5 $H_{principal\ body}$, and more preferably more than 2/3 $H_{principal\ body}$, with $H_{principal\ body}$ defined as being the distance between the point of intersection of the lower end of the principal body 6 with the skirt 8 and the crest of the principal body 6. When the condition mentioned above is satisfied, it is observed that the fluid is deflected along a trajectory which is practically vertical when the deflection surface 15 is an extension of the skirt 8 in a vertical direction.

Figure 8:
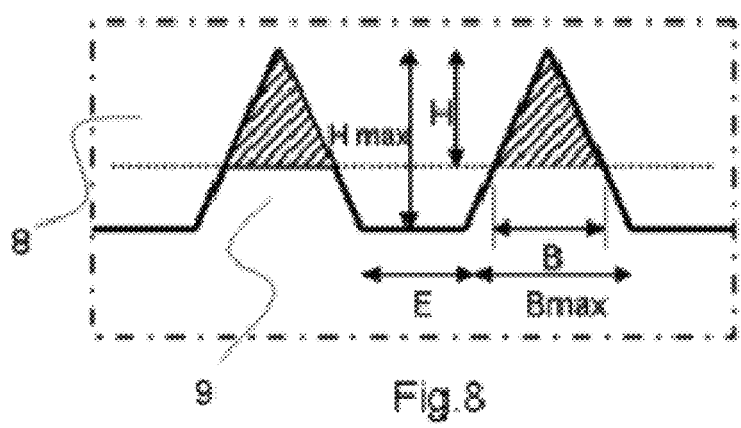
FIG. 8 is an enlarged view of the portion of the skirt of the distribution device of FIG. 7 enclosed by the box.

Notches 9, for example triangular in shape as shown in FIGS. 5, 7 and 8, are formed in the skirt 8. These notches 9 can advantageously be used to limit oscillation phenomena at the fluid to be distributed/denser ambient medium interface in the volume delimited below the cap 5. Preferably, the notches 9 are at a sufficient distance from each other so that individual jets of fluid to be distributed are formed and escape from said notches without mixing together before reaching the crest of the cap 5.

Referring now to FIG. 8, in the case in which the skirt comprises notches, the length 1 of the deflection surface 15 also satisfies the following condition:

$I_{deflector} > 0.4\ B_{max}$, preferably $I_{deflector} > 0.5\ B_{max}$, more preferably $I_{deflector} > 0.7\ B_{max}$, $B_{max}$ being the width of the notch measured from the end of the skirt 8.

In a preferred embodiment when the skirt 8 comprises notches, the number of notches on the circumference of the skirt is selected so that the distance E between two successive notches is more than 2/3 of $B_{max}$ and preferably more than of $B_{max}$.

Advantageously, E and $B_{max}$ are selected so that $E + B_{max} > 0.5\ (H_{principal\ body} + H_{skirt})$, where $H_{skirt}$ is the length of the skirt 8.

By way of example, a distribution device in accordance with the invention has the following characteristics:
Diameter of bell: 1 to 3 meters;
Length of inlet tube: 0.5 to 2 meters;
$H_{principal\ body}$: 0.3 to 1 meter;
$I_{deflector}$: 0.2 to 0.5 meters;
diameter of holes passing through the principal body: 5 to 50 mm;
density of holes passing through the principal body: 20 to 200 per square meter;
number of notches: 10 to 30;
distance E between two successive notches: 50 to 300 mm;
width of notches $B_{max}$: 50 to 250 mm.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. FR 13/55.365, filed Jun. 11, 2013 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fluid distribution device (1) comprising:
at least one means (2) for channeling a fluid, comprising a first and a second end (3, 4) and openings (7);
a cap (5) comprising a principal body (6) in the shape of a bell, the principal body (6) having an outer surface and an inner surface and being integral with the second end (4) of the means (2) for channeling fluid via the inner surface, said principal body being elongated by a skirt (8) extending in the direction of the second end (4) towards the first end (3) of the fluid channeling means (2) and being provided with a plurality of holes (10);
and in which the cap (5) comprises only one deflector (14) that forms a continuous circular flange arranged at the periphery of the cap (5) directly on the outer surface of the principal body (6) and is integral with said principal body (6), wherein the deflector comprises a flat deflection surface (15), flat meaning no curvature to said surface in another direction than necessary to form the circular flange by said deflector, and which is configured to direct or maintain the fluid towards or at the periphery of said cap (5).

2. The device according to claim 1, in which the deflection surface (15) forms an angle α with the axis D of the skirt (8) in the range 0° to 70°.

3. The device according to claim 2, in which the deflection surface (15) is essentially in alignment with said skirt (8) and the angle α is essentially equal to 0°.

4. The device according to claim 1, in which the skirt (8) comprises notches (9) located at the free end of said skirt (8).

5. The device according to claim 4, in which the notches (9) are triangular or rectangular in shape.

6. The device according to claim 1, in which the plurality of holes (10) over the principal body (6) are disposed in a regular pattern.

7. The device according to claim 1, in which the plurality of holes (10) have a circular section.

8. The device according to claim 1, in which the principal body (6) is lenticular in shape with a circular section and is elongated by a cylindrical skirt (8).

9. The device according to claim 1, in which the deflection surface (15) forms an angle α with the axis D of the skirt (8) in the range 0° to 45°.

10. The device according to claim 1, in which the deflection surface (15) forms an angle α with the axis D of the skirt (8) of 45°.

11. A reactor (11) comprising a vessel (12) and a distribution device according to claim 1 disposed in the vessel (12) and in which the section of the cap (5) of the distribution device is less than the internal section of the vessel (12).

12. The reactor according to claim 11, in which the distribution device is placed at the bottom of the reactor (11).

13. The reactor according to claim 11, further comprising a granular bed of catalyst disposed downstream of the distribution device (1).

14. The reactor according to claim 11, in which the reactor comprises a fluidized bed of catalysts.

15. A process for the treatment of a hydrocarbon feed or in a catalyst treatment process, comprising passing said feed through a reactor according to claim 11.

16. A fluid distribution device (1) comprising:
at least one tube or channel (2) for channeling a fluid, comprising a first and a second end (3, 4) and openings (7);
a cap (5) comprising a principal body (6) in the shape of a bell, the principal body (6) having an outer surface and an inner surface and being integral with the second end (4) of the tube or channel (2) for channeling fluid via the inner surface, said principal body being elongated by a skirt (8) extending in the direction of the second end (4) towards the first end (3) of the fluid channeling tube or channel (2) and being provided with a plurality of holes (10);

and in which the cap (5) comprises only one deflector (14) that forms a continuous circular flange arranged at the periphery of the cap (5) directly on the outer surface of the principal body (6) and is integral with said principal body (6), wherein the deflector comprises a flat deflection surface (15), flat meaning no curvature to said surface in another direction than necessary to form the circular flange by said deflector, and which is configured to direct or maintain the fluid towards or at the periphery of said cap (5).

17. The device according to claim 16, in which the deflection surface (15) forms an angle $\alpha$ with the axis D of the skirt (8) which is essentially equal to 0°, wherein the deflection surface (15) is essentially in alignment with said skirt (8).

18. The device according to claim 16, in which the deflection surface (15) forms an angle $\alpha$ with the axis D of the skirt (8) of 45°.

19. A reactor (11) comprising a vessel (12) and a distribution device according to claim 16 disposed in the vessel (12) and in which the section of the cap (5) of the distribution device is less than the internal section of the vessel (12).

20. A process for the treatment of a hydrocarbon feed or in a catalyst treatment process, comprising passing said feed through a reactor according to claim 19.

\* \* \* \* \*